United States Patent [19]
Shukla et al.

[11] Patent Number: 5,859,075
[45] Date of Patent: Jan. 12, 1999

[54] POLYURETHANE MICROSPHERES

[75] Inventors: Parshuram Gajanan Shukla; Swaminathan Sivaram, both of Maharashtra, India

[73] Assignee: Council of Scientific & Industrial Research, New Delhi, India

[21] Appl. No.: 118,304

[22] Filed: Jul. 16, 1998

Related U.S. Application Data

[62] Division of Ser. No. 50,798, Mar. 30, 1998, Pat. No. 5,814,675.

[51] Int. Cl.$^6$ .................................. C08J 9/16; C08J 9/20
[52] U.S. Cl. ................................ 521/56; 521/65; 521/155
[58] Field of Search ................................. 521/56, 65, 155

[56] References Cited

U.S. PATENT DOCUMENTS 3,615,972  10/1971  Morehouse, Jr. et al. ................ 521/56

*Primary Examiner*—Morton Foelak
*Attorney, Agent, or Firm*—Abelman, Frayne & Schwab

[57] ABSTRACT

The invention provides a process for the preparation of polyurethane microspheres, which comprises of preparing a solution of diol or polyol having a molecular weight in the range of 200–2000, crosslinker and a catalyst selected from amino or organometallic compounds, dispersing, this solution in dilute solution of stabilizer which consists of a block copolymer having the general formula $[A]_n-[B]_m$ where A and B are chemically and compositionally dissimilar segments and n and m segments are in between 30–115 and 10–60 units respectively, such that the sum of n and m does not exceed 175 units, in an aliphatic hydrocarbon, adding an isocyanate dropwise to this dispersion agitating the mixture at high speed of 100–1200 revolutions per minute, a temperature between 30° to 55° C. to permit the formation of polyurethane microspheres, separating these microspheres by filtration, washing with lower aliphatic hydrocarbon and drying the microspheres under vacuun.

1 Claim, No Drawings

POLYURETHANE MICROSPHERES

This application is a Divisional of application Ser. No. 09/050,798, field Mar. 30, 1998 U.S. Pat. No. 5,814,675.

FIELD OF THE INVENTION

The present invention relates to a process for the preparation of polyurethane microspheres. The invention more specifically relates to a process for the manufacture of spherical polyurethane microspheres with controlled particle size and shape. The preparation of polyurethane microspheres using the present invention has applications in the field of coatings, paints and powder molding applications. Powder coatings are solvent-free coating systems, that are applied to a substrate as a dry powder. The solid particles adhere to the substrate upon melting or by electrostatic attraction. Polyurethane powder can be used as one of the component in paint formulations. During slash molding process, a cast iron mold is heated to required temperature, powder is filled in a mold that is then annealed for specific time and at temperature and film is then separated. In most of these applications for getting the film of uniform thickness without any defects or fat edges it is necessary to have powder consisting of microspheres having low polydispersity.

PRIOR ART REFERENCES AND BACKGROUND OF THE INVENTION

Conventionally, polyurethane in powder form is prepared by the process of mechanical grinding of solid polyurethane (JP-02-124978). This process generates heat which needs to be removed by external cooling using liquid nitrogen at cryogenic temperatures. So this method does not yield polyurethane powder in controlled particle size and shape.

Polyurethane powder lacquers are prepared by first blocking polyisocyanates with a suitable blocking agents such as—caprolactam (DE 4,134,032) or 2,5-diketopiperazines (DE 4,204,995). The blocked polyisocyanates are then mixed with a prepolymer containing hydroxyl groups and other components such as pigment and fillers, homogenized at 80°–120° C. in an extruder. After cooling, the extrudate is broken and ground mechanically to yield powder polyurethane. JP 03-181526 disclose a method for preparation of polyurethane microparticles which involves dissolving polyurethane resin in amino alcohol at 130°–150° C. followed by cooling, filtering and drying under vacuum.

JP 04-248875 teaches a method for the preparation of polyurethane powder by reacting a resin having hydroxyl and/or amino group with blocked isocyanates in a suitable solvent at elevated temperature. Thereafter the solvent is removed by lowering the pressure. The powder is filtered and dried.

Spherical polyurethane particles are prepared by dispersion polymerization using water and/or alcohol as dispersing medium (JP 04-161416). Polyisocynate, polyol and other additives/reagents are first dissolved in organic solvent which is dispersed in water in presence of a stabilizer such as poly(ethyleneoxide- propyleneoxide) block copolymer, gelatin, poly(vinylalcohol), methyl cellulose or sodium alkyl sulfate.

In another variant of this process disclosed in JP 04-76016, urethane prepolymer along with a protective colloid such ethylene oxide propylene oxide block copolymer is dispersed in water containing a surfactant such a sodium salt of polyacrylic acid. Addition of bridging agent such a polyamine and stirring the mixture at room temperature yields polyurethlaiie powder. This technique has been employed in the preparation of polyurethane micocapsules containing oil soluble agent such as pesticide DDVP (Choi K. V. and Min K. S. Polymer (Korea), 14(4), 1990, pp 392–400), fenitrothion (Fuyama G.et. al., J. Pesticide Sci. 9, 1984, pp 511–516) and a non steroidal antiinflammatory agent diclofenac (Siva Readdy P. V. et. al., Macromolecular Reports, A32 (suppls 5&6)., 1995, pp 789–799). The principal drawback of these methods is that one obtains polydisperse particle sizes in the range of 50 to 500 microns.

Japanese Patents Nos. 04-255755,03-31359 and 04-202331 describe the use of a stabilizer derived from polycaprolactone polybutadiene and isophorone diisocynate for the dispersion polymerization of a polyol with a polyurethane prepolymer in n-heptane as the medium. The process was reported to give polyurethane powder without any agglomeration.

The prior art describes other stabilizers derived from poly(butylene adipate), maleic anhydride and lauryl methacrylate (JP 02-38453) and an addition product of alkoxy polyethylene-polypropylene glycol and polyisocyanates (JP 01-165617). Both these stabilizers can be used for the dispersion polymerization of polyurethane in a non aqueous medium. In these prior art processes, the proportion of stabilizer used is very high (10–30 wt % of total quantity of polyurethane forming reactants). This produces polydisperse particles having size range between 1–1000 microns. Furthermore, the reactions are carried out at elevated temperatures i.e. between 100°–200° C.

Particle forming polymerization processes are well known for vinyl monomers in the prior art, whereas particle forming polycondensation. (addition) processes are far less developed (Dispersion Polymerization in Organic medium, Ed. Barret K. E. J., John Wiley & Sons, 1975). Particle forming polycondensation processes in non-aqueous medium is even less rare. A stable dispersion of droplets or particles result when the attractive potential between two particles is less than repulsive potential. As repulsive potential is directly proportional to the dielectric constant of dispersion medium, stable disperaion can not be easily achieved in a medium of very low dielectric constant such as aliphatic hydrocarbons.

SUMMARY OF THE PRESENT INVENTION

As such, in order to overcome the drawbacks of the said prior art processes the Applicants have developed a simple process for the preparation of polyurethane mirospheres by directly using the corresponding monomers without the need for preparing any prepolymer.

OBJECTS OF THE INVENTION

The main object of the present invention provides process for the preparation of polyurethane mirospheres by directly using the corresponding monomers without the need for preparing any prepolymer.

It is an additional object of the present invention to provide a process Which can be carried out in a non-aqueous medium at low temperature.

It is also an object of the present invention to prepare polyurethane powder in a spherical form with relatively narrow particle size distribution in the range of 1–100 microns and preferably between 10 to 50 microns.

DETAILED DESCRIPTION OF THE INVENTION

Accordingly, the present invention provides a process for the preparation of polyurethane microspheres, which comprises of preparing a solution of diol or polyol having an average molecular weight in the range of 200–2000, crosslinker and a catalyst selected from amino or organo metallic compounds, dispersing this solution in dilute solution of stabilizer which consists of a block copolymer having the general formula $[A]_n-[B]_m$ where A and B are chemically and compositionally dissimilar segments and n and m segments are in between 30–115 and 10–60 units respectively such that the sum of n+m does not exceed 175, in an aliphatic hydrocarbon, adding an isocyanate dropwise to this dispersion, agitating the mixture at a high speed of 1200 revolution per minute at a temperature between 30° to 55° C. to permit the formation of polyurethane micropsheres, separating these microspheres by filtration, washing with lower aliphatic hydrocarbon and drying the microspheres under vacuum.

The diols suitable for use in the present invention are ethylene glycol, dietheylene glycol, propylene glycol, 1,4-butane diol, 1,4 hexane diol, dipropylene glycol, cyclohexyl 1,4 dimethanol, 1,8 octane diol and polyols such as poly (ethylene glycols), poly(propylene glycols), poly (tetramethylene glycols) with average molecular weights in the range of 200–2000.

The preferred crosslinkers are compounds containing more than two hydroxyl functionalities, for example, trimethylolpropane, glycerol, hexane, triols and pentaerythrytol. The amount of crosslinker used based on diol is in the range of 5–40 wt. %, preferably 10 to 20 wt. %.

Catalysts suitable for use in the invention are amino or organometallic compounds such as N,N-dimethylaminoethanol, N-N-dimethylcyclohexylamine, bis-(2-dimethylaminoethyl)ether, N,N dimethylcetylamine, diaminobicyclooctane, stannous octoate and dibutyltin dilaurate having concentration 0.1–0.3 wt. % based on diol.

Yet another important feature of the present invention is the choice of the stabilizers which consist of block copolymers with the general formula $[A]_n-[B]_m$ and are prepared by sequential anionic polymerizationl of monomer A followed by monomer B using methods described in prior art (Walbridge D. J., Chapter 3, In: Dispersion polymerization in organic medium, Ed. Barret K. E. J., John Wiley & Sons, 1975), Block copolymers thus prepared have a number average molecular weight in the range of 2000 to 10000 and polydispersities as defined by the ratio of weight average molecular weight to number average molecular weight less than 1.1. Typically, block A comprises of segments of a diene or olefin polymer such as poly (butadiene), poly (isoprene), poly (ethylene) and poly (ethyleneco-propylene). Block B comprises segments of a polymer derived from ethylene oxide and/or propylene oxide such as poly (ethylene oxide), poly (propylene oxide) and poly (ethyleneoxide-co-propyleneoxide).

The solvents suitable for use in the invention as continuous phase are aliphatic hydrocarbons of the general formula $C_nH_{2n+2}$ where n can be between 6–16. Examples are hexane, octane, decane, isooctane, dodecane, liexadecane, superior kerosene, paraffin oil, white mineral oil, molex raffinate or suitable mixtures thereof The said aliphatic hydrocarbons are used in quantity of 10–30 g per g diol, preferably between 15–25 g per g diol.

The isocynates suitable for use in the invention are, toluene diiosynate, methylene diisocyanate, isophorone diisocyanate, cyclohexane-1–4, diisocyanate, hexamethylene diisocyanate, m-tetramethylxylene (diiusocyanate, 2,2, 4-and 2,4,4-trimethyl hexamethylene diiusocyanate and 2.5-norborane diisocyanate.

Typically, the equivalent ratio of isocyanate to diol is maintained between 1 to 1.4, preferably between 1.1 to 1.2. The amount of crosslinker used is between 5 to 30 wt % based on diol, the preferred amount being 10 to 20 wt %. The stabilizer is added as a solution in hydrocarbon, the concentration being in the range of 0.05 to 0.2 wt %. The total quantity of stablizer varies between 0.5 to 3.0 wt % based on diol. The preferred quantity is between 1.1 to 1.9 wt % based on diol. The ratio of the hydrocarbon solvent and diol is maintained between 10 to 30 the preferred ratio being 15 to 25. In the present process, fine silica is added at a ranging of 0.1 g to 0.3 g.

The reaction is conducted in a suitable apparatus with arrangement for efficient agitation. The agitator speed may be not be less than 1000 revolutions per minute preferably 1100 revolutions per minute. The mixture of isocyanate and aliphatic hydrocarbon is fed slowly into the reactor containing dispersion of diol, crosslinker and catalyst in aliphatic hydrocarbon, at the rate of 0.5 to 1.0 ml per minute.

In another embodiment of the present invention, the reaction temperature is maintained between 25° to 60° C., preferably between 35°–50° C. The reaction time is typically between 7–10 hours. The reaction mixture progressively turns opaque as the microdroplets coalesce to form hard microspheres. At the end of the reaction, the microspheres of polyurethane containing monocrotophos are decanted, washed thoroughly with hexane and dried under vacuum. The yields are typically in the range of 60 to 85 wt % based on the total weight of diol, isocyanate and crosslinker charged. The microspheres have a particle size in the range of 1 to 100 microns Particle size can be controlled within more narrower limits by appropriate choice of the stabilizer, its concentration and agitator speed.

The invention is further illustrated by the following examples which should not be construed to limit the scope of the invention in any manner.

EXAMPLE 1

A solution is prepared by dissolving 0.0052 diaminobicyclooctane, 0.3 g trimethylolpropane and 3.0 g of ethylene glycol by heating the mixture at 50° C. for 10 minutes.

The stabilizer (50 mg), namely, a block copolymer of butadiene with ethylene oxide wherein the ratio of number average molecular weight of butadiene segment to ethylene oxide segments is 2.5 is dissolved in 10 g of paraffin oil.

A mixture of 10.8 g toluene diisocyanate with 5 g of paraffin oil is prepared;

5 g solution of the stabilizer in paraffin oil is placed in a vessel having a volume of approximately 250 mL and is further diluted by addition of 50 g of paraffin oil. The solution is brought to 35° C. and agitated using a turbine type stirrer at a speed of 1200 revolutions per minute. The solution of diol, crosslinker and catalyst is added. After 15 minutes when emulsion of required droplet size is formed, a mixture of toluene diisocynate and paraffin oil (8 g) is added dropwise over a period of 12 minutes. This is followed by addition of 2.5 g solution of stabilizer in paraffin oil. Remaining quantity (7.8 g) of toluene diisocynate and paraffin oil is added in a similar way as described above followed by addition of 2.5 g solution of stabilizer in paraffin oil.

After a period of 4 hours 0.2 g fine silica is added and speed is reduced to 700 revolution per minute. Thereafter by stirring the mixture for further 3 hours the temperature of the mixture is increased to 50° C. After stirring the mixture at 50° C. for 1 hour, the temperature is lowered to 35° C. and 30 mL hexane is added. The mixture is then stirred for 10 minutes at 300 revolutions per minute.

The polyurethane microspheres are isolated by filtering the mixture, washing with hexane and drying under vacuum at 25° C. for 3 hours.

The yield of the product is 11.0 g. The spherical particles have a particle size in the range of 2–140 microns of which a majority (90%) of particles are in the range of 4–65 microns.

EXAMPLE 2

A solution is prepared by dissolving 0.00052 g diamninobicyclootane, 0.3 g trimethylolpropane and 3.0 g of polytetiamethylene glycol having molecular weight of 250 by heating the mixture at 50° C. for 10 minutes.

The stabilizer (50 mg), namely, a block copolymer of butadiene with ethylene oxide wherein the ratio of number average molecular weight of butadiene segment to ethylene oxide segments is 2.5 is dissolved in 10 g of paraffin oil.

A mixture of 3.4 g toluene diisocyanate with 2.6 g of paraffin oil is prepared.

5 g solution of the stabilizer in paraffin oil is placed in a vessel having a volume of approximately 250 mL and is further diluted by addition of 50 g of paraffin oil. The solution is brought to 35° C. and agitated using a turbine type stirrer at a speed of 1200 revolutions per minute. The solution of polytetramethylene glycol, crosslinkers and catalyst is added. After 15 minutes when emulsion of required droplet size is formed, a mixture of toluene diisocynate and paraffin oil (3 g) is added dropwise over a period of 6 minutes. This is followed by addition of 2.5 g solution of stabilizer in paraffin oil. Remaining quantity (3 g) of toluene diisocynate and paraffin oil is added in a similar way as described above followed by addition of 2.5 g solution of stabilizer in paraffin oil. The ratio of the hydrocarbon solvent and diol is maintained between 10–30 the preferred ratio being 15–25.

After a period of 4 hours 0.2 g fine silica is added and speed is reduced to 700 revolution per minute. Thereafter by stirring the mixture for further 3 hours the temperature of the mixture is increased to 50° C. After stirring the mixture at 50°C. for 1 hour, the temperature is lowered to 35° C. and 35 mL hexane is added. The mixture is then stirred for 10 minutes at 300 revolutions per minute.

The polyurethane mnicrospheres are isolated by filtering the mixture, washing with hexane and drying under vacuum at 25° C. for 3 hours.

The yield of the product is 5.6 g. The spherical particles have a particle size in the range of 2–160 microns of which a majority (90%) of particles are in the range of 12–35 microns.

EXAMPLE 3

A solution is prepared by dissolving 0.0052 g diamninobicyclootane, 0.3 g trimethylolpropane and 3.0 g of ethylene glycol by heating the mixture at 50° C. for 10 minutes.

The stabilizer (50 mg), namely, a block copolymer of butadiene with ethylene oxide wherein the ratio of number average molecular weight of butadiene segment to ethylene oxide segment is 3.6 is dissolved in 10 g of paraffin oil.

A mixture of 10.8 g toluene diisocyanate with 5 g of paraffin oil is prepared.

5 g solution of the stabilizer in paraffin oil is placed in a vessel having a volume of approximately 250 mL and is further diluted by addition of 50 g of paraffin oil. The solution is brought to 35° C. and agitated using a turbine type stirrer at a speed of 1200 revolutions per minute. The solution of diol, crosslinker and catalyst is added. After 15 minutes when emulsion of required droplet size if formed, a mixture of toluene diisocynate and paraffin oil (8 g) is added dropwise over a period of 12 minutes. This is followed by addition of 2.5 g solution of stabilizer in paraffin oil. Remaining quantity (7.8 g) of toluene diisocynate and paraffin oil is added in a similar way as described above followed by addition of 2.5 g solution of stabilizer in paraffin oil.

After a period of 4 hours 0.2 g fine silica is added and speed is reduced to 700 revolution per minute. Thereafter by stirring the mixture for further 3 hours the temperature of the mixture is increased to 50° C. After stirring the mixture at 50° C. for 1 hour, the temperature is lowered to 35° C. and 30 mL hexane is added. The mixture is then stirred for 10 minutes at 300 revolutions per minute.

The polyurethane microspheres are isolated by filtering the mixture washing with hexane and drying under vacuum at 25° C. for 3 hours.

The yield of the product is 10.0 g. The spherical particles have a particle size in the range of 2–120 microns of which a majority (90%) of particles are 4–32 microns.

EXAMPLE 4

A solution is prepared by dissolving 0.0052 g diaminobicyclooctane, 0.3 g trimethylolpropane and 3.0 g of polytetramethylene glycol having molecular weight of 2000 by heating the mixture at 70° C. for 20 minutes.

The stabilizer (50 mg), namely, a block copolymer of butadiene with ethylene oxide wherein the ratio of number average molecular weight of butadiene segment to ethylene oxide segment is 2.5 is dissolved in 10 g of paraffin oil.

A mixture of 1.0 g toluene diisocyanate with 1.0 g of paraffin oil is prepared.

5 g solution of the stabilizer in paraffin oil is placed in a vessel having a volume of approximately 250 mL and is further diluted by addition of 50 g of paraffin oil. The solution is brought to 35° C. and agitated using a turbine type stirrer at a speed of 1200 revolutions per minute. The solution of polytetramethylene glycol, crosslinker and catalyst is added. After 15 minutes when emulsion of required droplet size is formed, a mixture of toluene diisocynate and paraffin oil (1 g) is added dropwise over a period of 3 minutes. This is followed by addition of 2.5 g solution of stabilizer in paraffin oil. Remaining quantity (1 g) of toluene diisocynate and paraffin oil is added in a similar way as described above followed by addition of 2.5 g solution of stabilizer in paraffin oil.

After a period of 4 hours, 0.2 g fine silica is added and speed is reduced to 700 revolution per minute. Thereafter, by stirring the mixture for further 3 hours the temperature of the mixture is increased to 50° C. After stirring the mixture at 50° C. for 1 hour, the temperature is lowered to 35° C. and 30 mL hexane is added. The mixture is then stirred for 10 minutes at 300 revolutions per minute.

The polyurethane microspheres are isolated by filtering the mixture, washing with hexane and drying under vacuum at 25° C. for 3 hours.

The yield of the product is 3.5 g. The sphereical particles have a particle size in the range of 2–160 microns of which a majority (90%) of particles are in the range of 10–100 microns.

EXAMPLE 5 (comparative example)

A solution is prepared by dissolving 0.0052 g diaminobicyclooctane, 0.3 g trimethylolpropane and 3.0 g of ethylene glycol by heating the mixture at 50° C. for 10 minutes.

The mixture of 10.8 g toluene diisocyanate with 5 g of paraffin oil is prepared.

50 g of paraffin oil is placed in a vessel having a volume of approximately 250 mL. The oil is brought to 35° C. and agitated using a turbine type stirrer at a speed of 1200 revolutions per minute. The solution of diol, crosslinker and catalyst is added. After 15 minutes when emulsion of required droplet size is formed, a mixture of toluene diisocynate and paraffin oil (15.8 g) is added dropwise over a period of 25 minutes.

After a period of 10 minutes the reaction mixture gels and large lumps separate from the reaction.

This experiment indicates that polyurethane powder can not be prepared without the use of a suitable stabilizer.

Advantages of the Present Invention

Polyurethane powder consisting of spherical microspheres with relatively narrow particle size distribution in the range of 1–100 microns and preferably between 10 to 50 microns can be prepared in non-aqueous medium at low temperatures without the need of preparing any prepolymer. The process of the present invention is therefore useful for microencapsulation of a variety of water soluble active agents from agrochemical or industrial chemicals including those which are water sensitive or reactive. Additionally, the polyurethane microspheres prepared by the process of the present invention has applications in the field of coatings, adhesives and paints. The polyurethane produced by the present invention is in the form of free flowing microspheres and hence useful as components of blending in an extruder with other polymers. By suitably varying the nature of diol or polyol, polyurethane microspheres with properties ranging from soft elastomers to hard thermoplastics can be prepared.

We claim:

1. Free flowing polyurethane microspheres useful as components for blending in an extruder with other polymers, having a particle size distribution which ranges between about 1 to about 100 microns, said microspheres being produced by a process, which comprises:

preparing a solution of a diol or a polyol having a molecular weight in the range of from about 200 to about 2000, a crosslinker and a catalyst selected from amino or organometallic compounds, dispersing this solution in a dilute solution of a stabilizer which comprises a block copolymer having the general formula $[A]_n-[B]_m$ where A and B are chemically and compositionally dissimilar segments and n and m segments are between about 30 to about 115 and about 10 to about 60 units, respectively, such that the sum of n and m does not exceed 175 units, in an aliphatic hydrocarbon; adding an isocyanate dropwise to this dispersion; agitating the mixture at a speed of about 100 to about 1200 revolutions per minute and at a temperature between about 30° to about 55° C. to permit the formation of polyurethane microspheres; separating these microspheres by filtration; washing with a lower aliphatic hydrocarbon; and, drying the microspheres under vacuum.

* * * * *